(12) United States Patent
Burke

(10) Patent No.: US 8,847,070 B2
(45) Date of Patent: Sep. 30, 2014

(54) GRADE LEVEL ENCLOSURE CONVERSION ASSEMBLY

(71) Applicant: Channell Commercial Corp., Temecula, CA (US)

(72) Inventor: Edward J. Burke, Temecula, CA (US)

(73) Assignee: Channell Commercial Corporation, Temecula, CA (US)

( * ) Notice: Subject to any disclaimer, the term of this patent is extended or adjusted under 35 U.S.C. 154(b) by 0 days.

(21) Appl. No.: 13/827,594

(22) Filed: Mar. 14, 2013

(65) Prior Publication Data

US 2014/0196380 A1     Jul. 17, 2014

Related U.S. Application Data

(60) Provisional application No. 61/752,906, filed on Jan. 15, 2013.

(51) Int. Cl.
| | |
|---|---|
| *H01J 5/00* | (2006.01) |
| *H02J 15/00* | (2006.01) |
| *H02G 3/08* | (2006.01) |
| *H05K 5/00* | (2006.01) |
| *H02B 1/50* | (2006.01) |

(52) U.S. Cl.
CPC ........................................ *H02B 1/50* (2013.01)
USPC ............................................... 174/37; 174/50

(58) Field of Classification Search
CPC .. G02B 6/4442; G02B 6/4451; H02G 3/0493; H02G 3/185; H02G 9/10
USPC ........... 174/50, 37, 17 R, 481, 53, 57, 58, 54, 174/60, 38; 361/600, 641, 659, 724, 730, 361/796
See application file for complete search history.

(56) References Cited

U.S. PATENT DOCUMENTS

| | | | |
|---|---|---|---|
| 5,210,374 A | * | 5/1993 | Channell .......................... 174/38 |
| 6,362,419 B1 | * | 3/2002 | Gallagher et al. .............. 174/37 |

(Continued)

FOREIGN PATENT DOCUMENTS

GB     2 307 563 A     5/1997

OTHER PUBLICATIONS

Channell, *Where The Industry Connects*, 2000 Channell Corporation, Printed in the U.S.A. 10/00/20M, pp. 7-1, 7-4, 9-2, 4 pages.

(Continued)

*Primary Examiner* — Yuriy Semenenko
(74) *Attorney, Agent, or Firm* — Christie, Parker & Hale, LLP

(57) ABSTRACT

A grade level enclosure conversion assembly adapted for converting a pedestal housing between a flush-to-grade and an above-ground pedestal installation. The base of the pedestal housing carries a plug removably mounted to a swing-arm in the grade level enclosure. The swing-arm holds the pedestal assembly in a stored position in the flush-to-grade installation, containing wiring for service connections. To convert to the above-ground installation, a solid grade level cover plate lid is removed, and the pedestal assembly is rotated on the swing arm to a raised position from which it can be removed from the swing-arm (along with the wiring) and fed through an access opening in a separate cover plate lid. The plug on the pedestal housing is then positioned in the access opening to hold the pedestal assembly in the above-ground position. A series of separate fiber optic splice connections, or other underground utility service connections, can be made when rotating the pedestal between the stored position and the above-ground position.

10 Claims, 17 Drawing Sheets

(56) References Cited

U.S. PATENT DOCUMENTS

| | | |
|---|---|---|
| 7,385,137 B2 | 6/2008 | Burke et al. |
| 7,418,183 B2 * | 8/2008 | Wittmeier et al. ............ 385/135 |
| 7,728,224 B2 * | 6/2010 | Maloney et al. ................ 174/38 |
| 8,249,411 B2 * | 8/2012 | Burke ........................... 385/135 |
| 8,285,103 B2 | 10/2012 | Reagan et al. |
| 8,502,071 B2 * | 8/2013 | Caveney et al. ............. 174/68.3 |
| 2002/0096346 A1 * | 7/2002 | Maloney et al. ................ 174/50 |
| 2009/0175588 A1 | 7/2009 | Brandt et al. |
| 2009/0238530 A1 | 9/2009 | Wakileh et al. |

OTHER PUBLICATIONS

International Search Report and Written Opinion for Application No. PCT/US2014/010747; date of mailing Apr. 1, 2014; 8 pages.

* cited by examiner

GRADE LEVEL ENCLOSURE CONVERSION ASSEMBLY

CROSS-REFERENCE

This application claims priority to U.S. Provisional Application No. 61/752,906 filed Jan. 15, 2013 incorporated herein in its entirety by this reference.

FIELD OF THE INVENTION

This invention relates to enclosures for buried underground utility lines. One use of the invention is for making splice connections for optical fiber communication lines.

BACKGROUND

In the past, underground utility enclosures were characterized by permanent underground installations in which a sealed pedestal housing with splice connections was stored in a grade level enclosure. Alternatively, above-ground pedestals were characterized by permanent installations with access for splice connections made when adding a new service, for example.

The present invention allows a pedestal housing to be easily converted from a below-ground flush-to-grade installation to an above-ground pedestal installation, or vice versa.

SUMMARY OF THE INVENTION

An underground electrical utilities vault and distribution enclosure system is adapted for conversion between a flush-to-grade installation and an above-ground pedestal installation, convertible either way. The system includes a grade level box or vault that contains a pedestal housing. The base of the pedestal housing includes a plug adapted for releasable connection to an access opening in a lid for the grade level box. The pedestal and plug assembly is releasably mounted to a swing-arm inside the grade level box. The swing-arm holds the assembly in a stored position inside the box. Underground electrical cables, such as optical fiber conduits contained in the grade level box, are connected to contacts inside the pedestal housing. The pedestal assembly, in its stored position, is part of a flush-to-grade installation. A cover plate provides at least a portion of a lid for the box, in its flush-to-grade position.

The pedestal assembly can be converted to an above-ground installation by removing the cover plate from the grade level box and raising the pedestal above-ground via a hinged connection carried by the swing-arm. The pedestal assembly is raised to a position where it can be removed from the swing-arm and fed up through an access opening in a separate cover plate lid for the grade level box. (In one embodiment, the cover plate lid can be the plug opening part of a two-part split cover plate for closing off the opening in the grade level box.) The pedestal assembly, including the plug and connected wiring, are drawn up through the access opening in the cover plate lid to a position above the lid from which the plug can be installed in the access opening. This positions the pedestal housing above-ground, with its connections to the below-ground wiring.

The above-ground installation can be converted back to a flush-to-grade installation. In this instance the plug is detached from the cover plate lid and the previous series of steps is reversed, for moving the pedestal assembly back to its storage position in the flush-to-grade installation.

These and other aspects of the invention will be more fully understood by referring to the following detailed description and the accompanying drawings.

DETAILED DESCRIPTION

Figure 1:
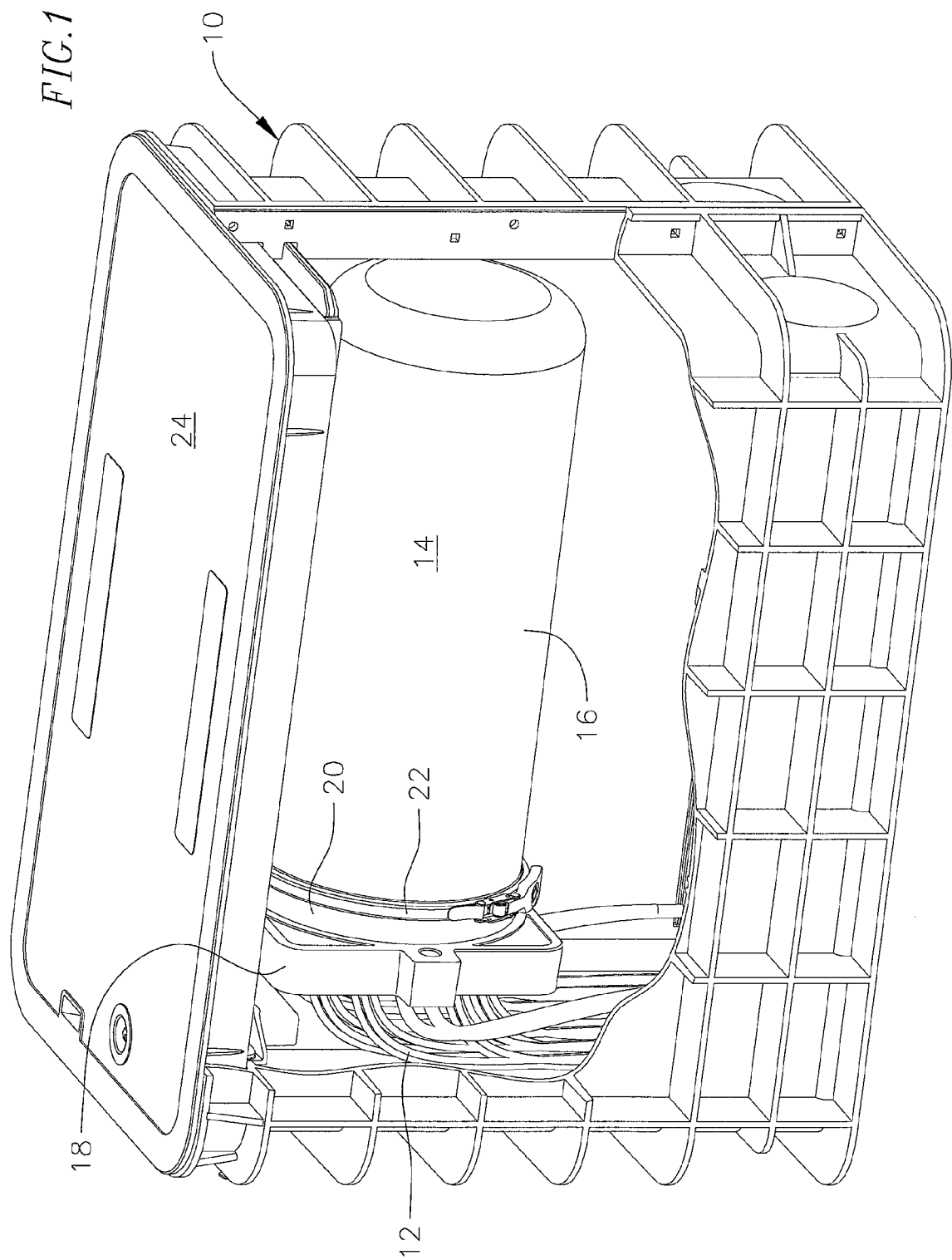
FIG. 1 is a perspective view, partly broken away, showing a pedestal housing assembly in a storage position in a grade level box.

FIG. 1 shows an underground utility enclosure which includes a grade level box 10. The grade level box can have various embodiments, typically buried below-ground with an open bottom to receive wiring 12 attached to electrical components stored within a pedestal housing 14. The pedestal housing protects the underground utility connections when they are brought above-ground for connecting to service lines from the customer, for example. The grade level box itself, being placed below-ground, can contain electrical connections such as utility cables or conduits, data transmission lines, service lines, optical fiber cables and other underground utility devices, lines or cables. One use is for containing fiber optic tubes having optical fibers for splice connections when providing residential fiber optic service connections.

The drawings illustrate a preferred grade level box having vertical side walls with a molded supporting grid structure that provides I-beam support for both the pedestal housing and a top plate that supports the pedestal housing. The grade level box and below-ground wiring connections to the pedestal assembly are described in more detail in U.S. Pat. Nos. 7,385,137 and 7,381,888 to Burke et al., assigned to Channell Commercial Corporation and incorporated herein in their entirety by this reference.

The pedestal housing 14 shown in FIG. 1 includes a dome-shaped pedestal cover 16 removably secured at its base to a plug 18. The plug is described in detail in the '137 and '888 patents to Burke et al. In one embodiment the base of the pedestal cover is secured to a collar 20 by a clamp 22. The collar is rigidly secured to a large opening in the plug, preferably by adhesively bonding it, although other means of securing the collar to the plug may be used. The collar can support a rigid internal mounting frame (not shown) for supporting splice trays or other similar contacts for splice connections or other similar connections inside the pedestal housing.

Figure 10:
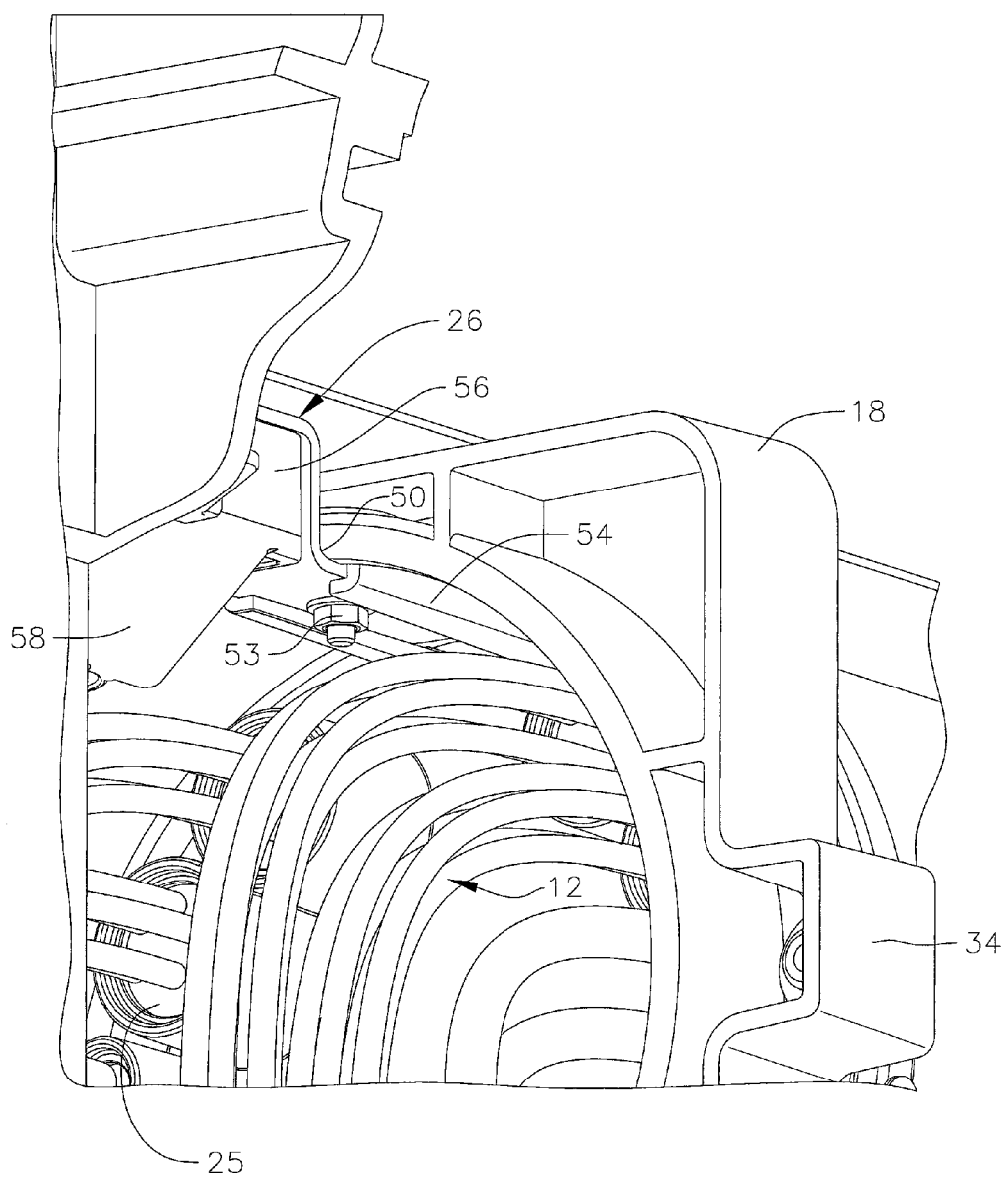
FIG. 10 is an enlarged perspective view, showing a swing-arm bracket bolted to a plug carried at the base of the pedestal assembly.
Figure 11:
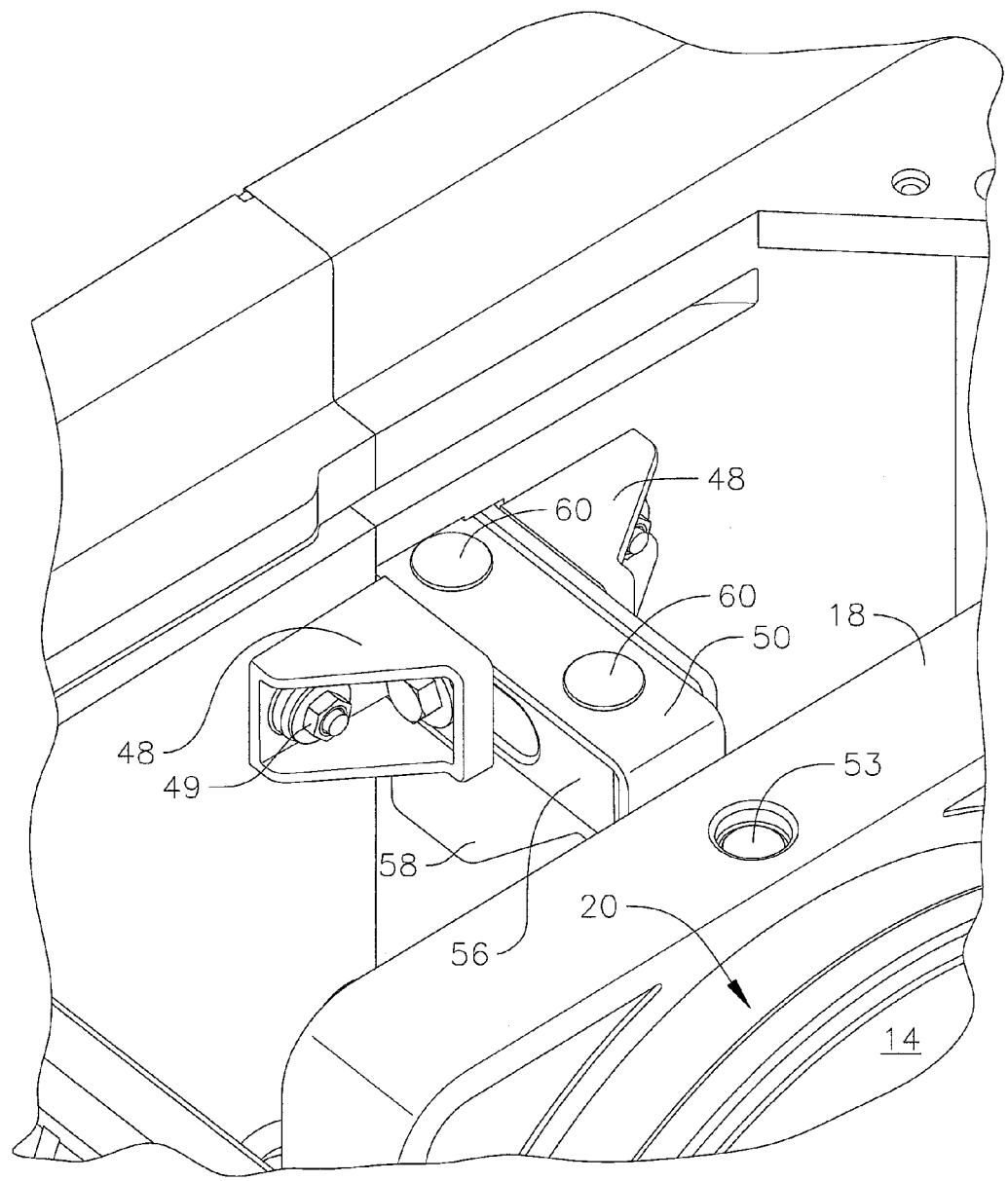
FIG. 11 is an enlarged perspective view showing the swing-arm bracket fastened to the plug and supporting the pedestal assembly in its stored position.
Figure 12:
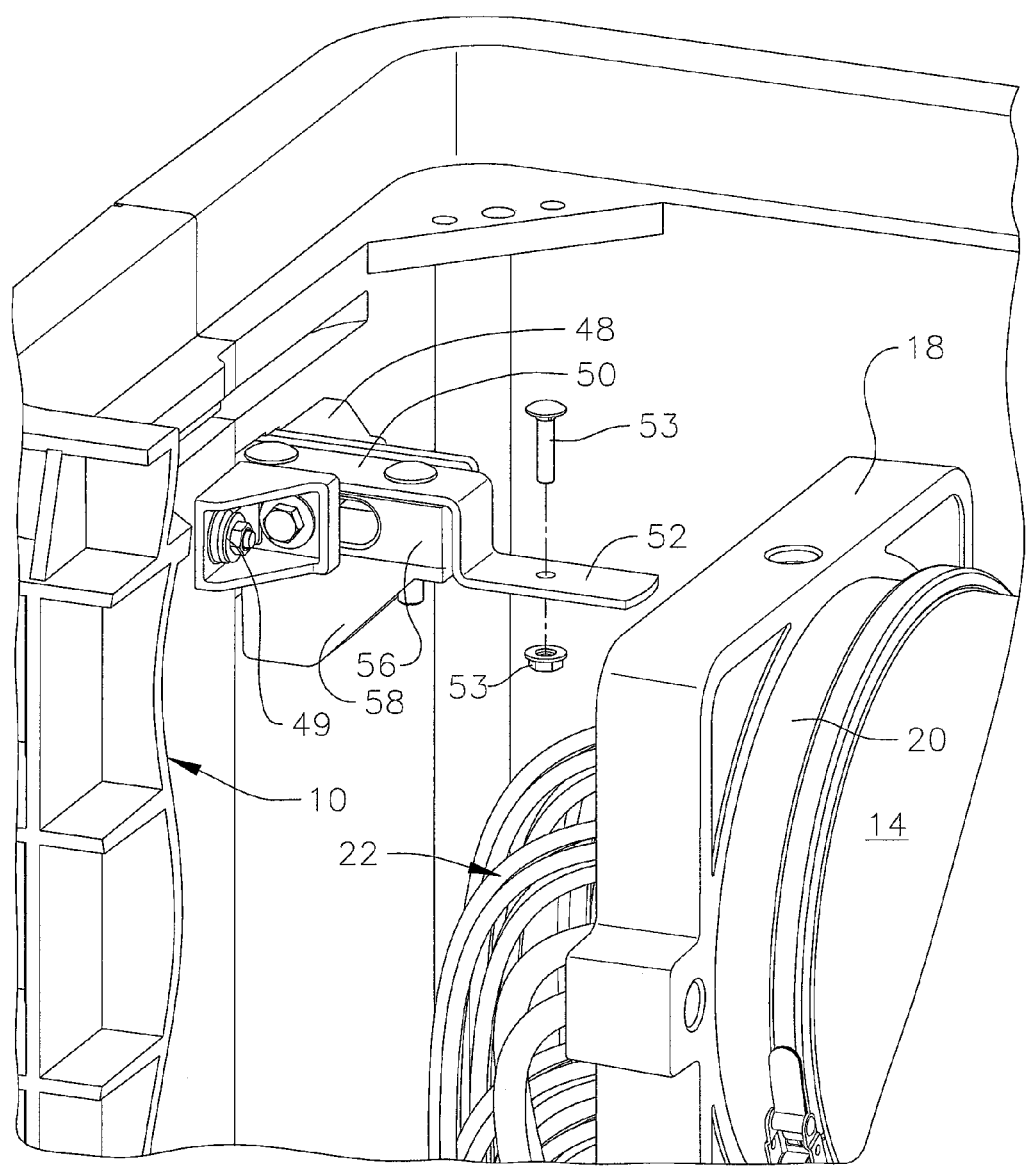
FIG. 12 is an enlarged perspective view showing the swing-arm bracket with the pedestal assembly removed from the swing-arm.
Figure 13:
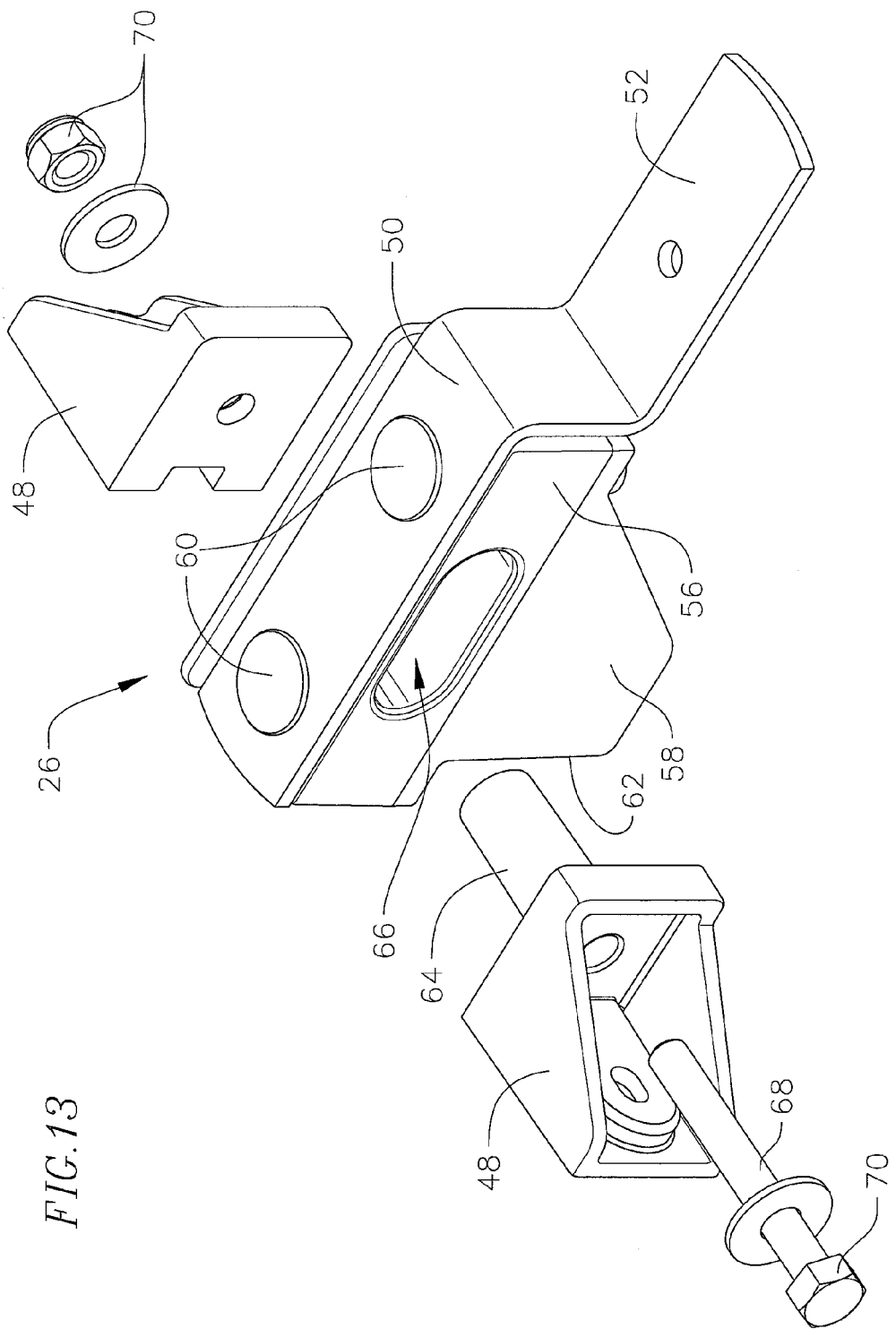
FIG. 13 is an exploded perspective view showing components of the swing-arm assembly of this invention.
Figure 15:
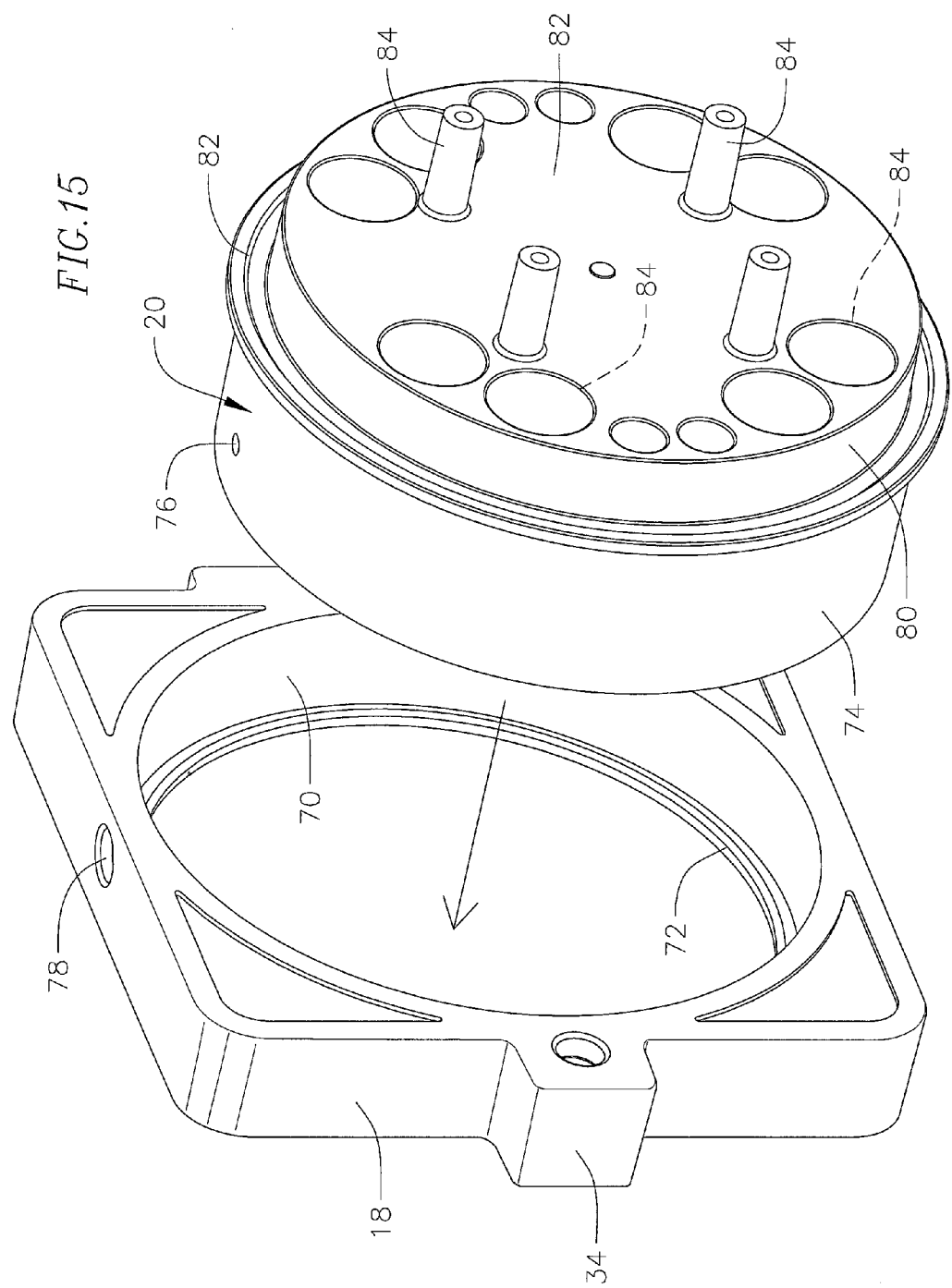
FIG. 15 is an exploded perspective view showing components of a plug and collar assembly used at the base of the pedestal assembly.
Figure 16:
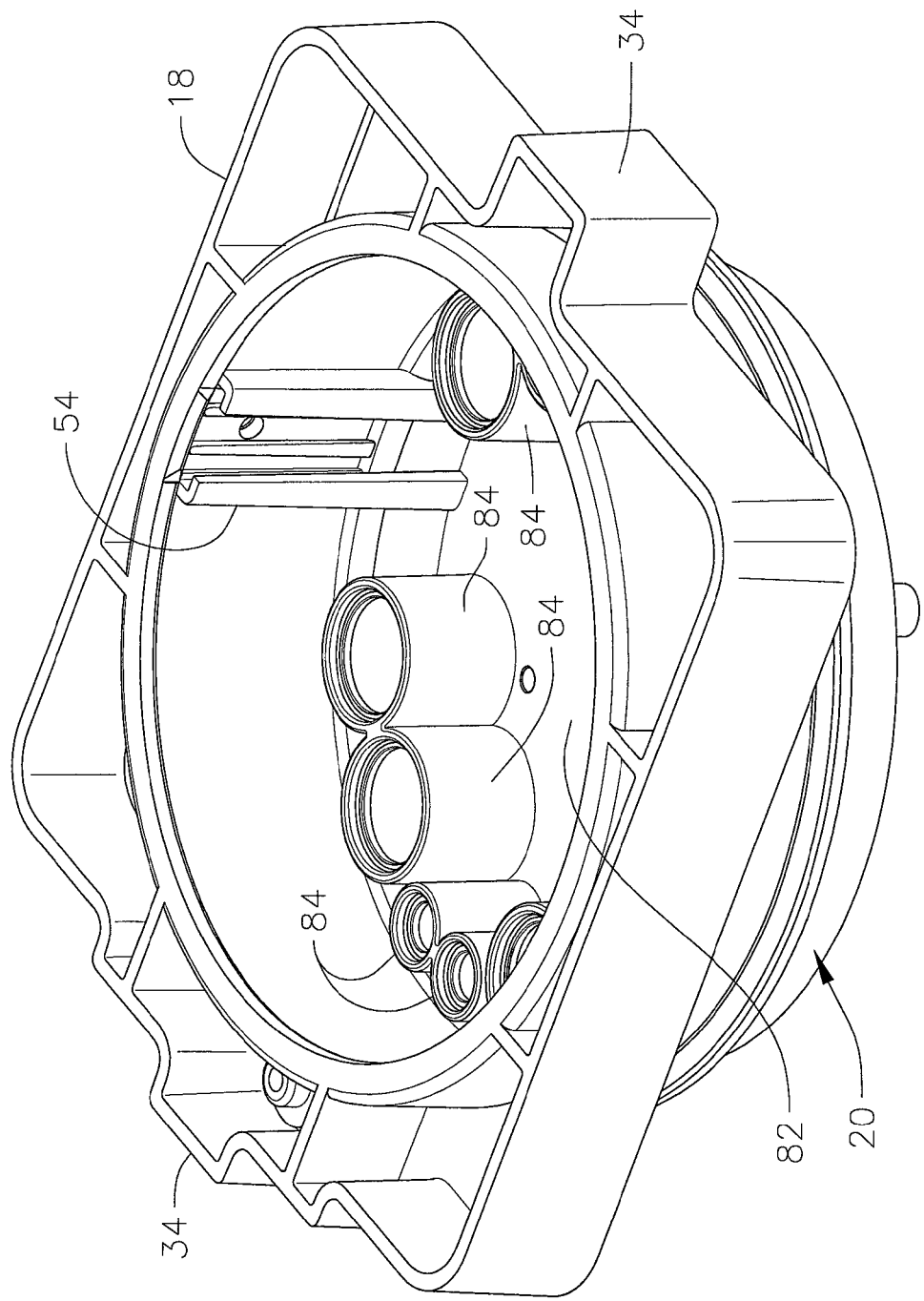
FIG. 16 is a bottom perspective view showing the interior structure of the collar component of the plug/collar assembly.
Figure 17:
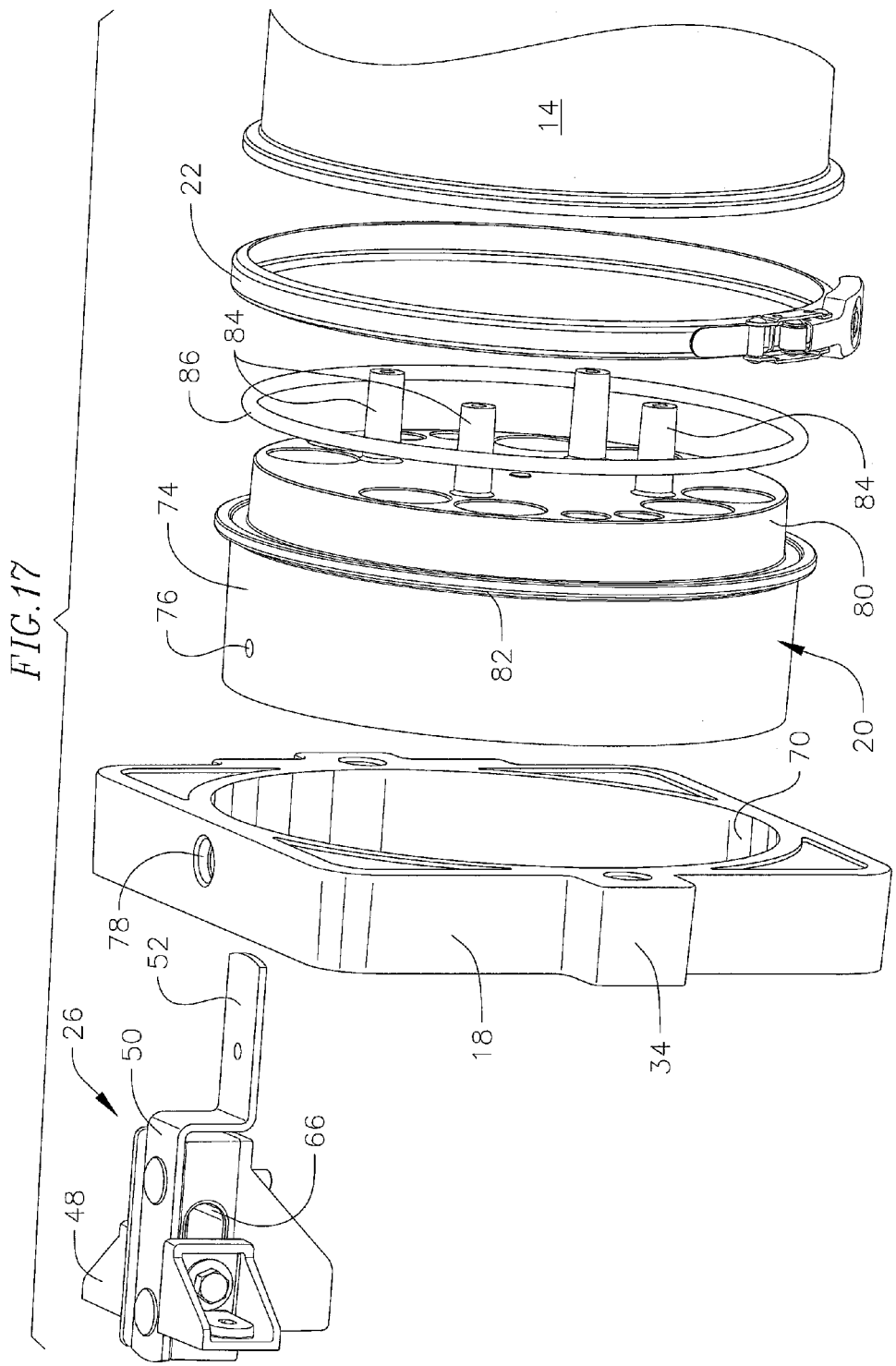
FIG. 17 is an exploded side view showing components of the grade level enclosure conversion assembly.

The wiring 12 extends from inside the grade level box, through the opening in the plug and the collar and into the interior of the pedestal housing. As mentioned, the wiring can contain splice connections or is adapted for later splicing contacts, for providing service to the premises. The collar contains seals 25 (shown in FIG. 10) for the wiring passing through the collar and into the interior of the pedestal housing. FIGS. 15-17 show a more detailed construction of the collar 20 and plug 18 assembly.

Figure 2:
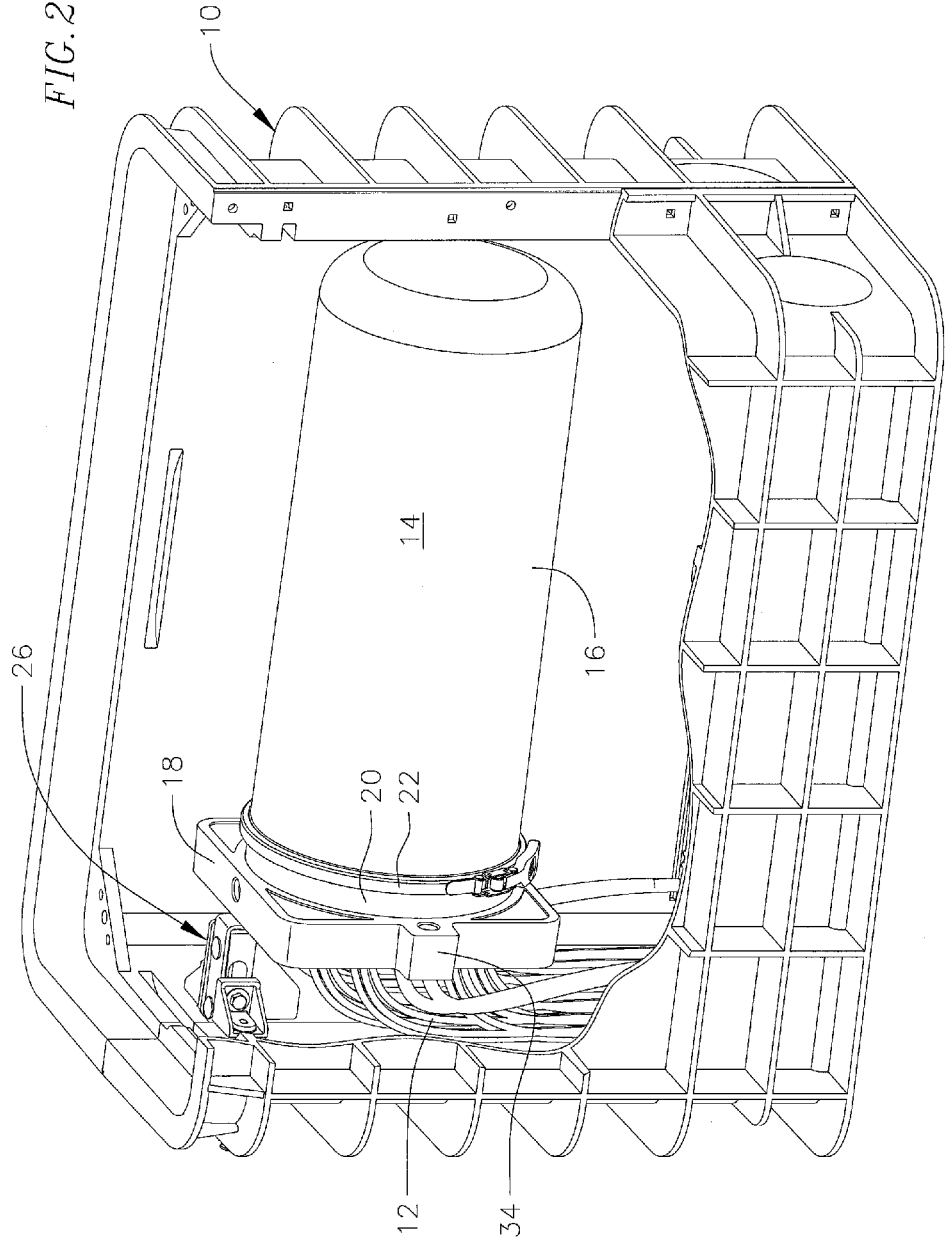
FIG. 2 is a perspective view, partly broken away, showing the pedestal housing assembly carried on a swing-arm assembly.

FIG. 1 shows the pedestal housing 14 stored in the grade level box, with a solid top plate or lid 24 which provides a flush-to-grade installation. The lid is removable from the top of the grade level box as shown in FIG. 2. The lid is removable so that the pedestal housing (and the plug attached to its base) can be raised to an above-ground position, i.e., converted to an above-ground pedestal installation.

As shown in FIG. 2, the pedestal housing is maintained in its stationary below-ground storage position via its attachment to a swing-arm assembly 26, one end of which is rigidly secured to an inside wall of the grade level box. The opposite end of the swing-arm assembly is releaseably attached to the pedestal housing and plug assembly, via a structure described in more detail below. The swing-arm assembly 26 has a hinged structure that allows the pedestal housing and plug assembly to be rotated as a unit about a horizontal axis for raising the assembly from its stored position to an above-ground position.

Figure 3:
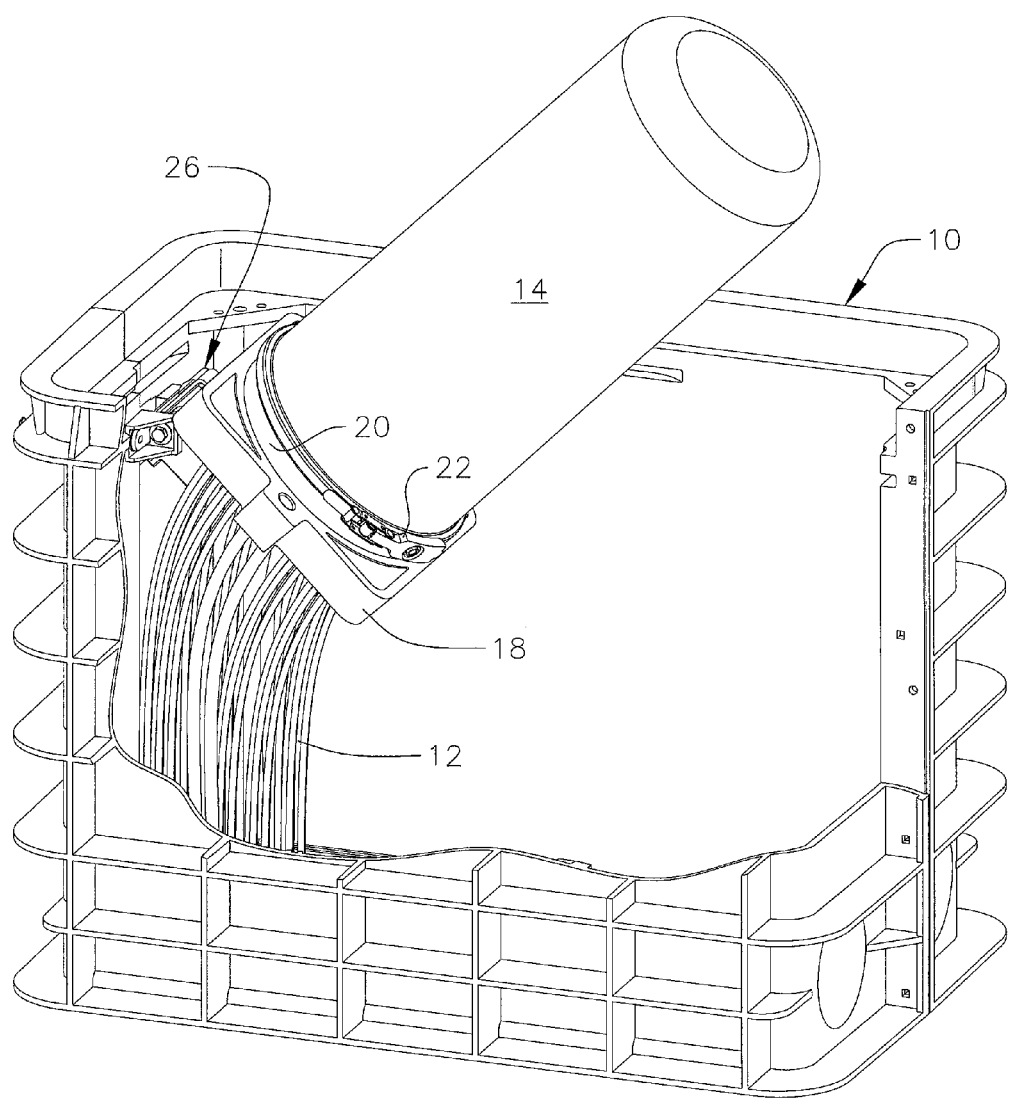
FIG. 3 is a perspective view, partly broken away, showing the enclosure on the swing-arm being raised.

FIG. 3 shows a first step in raising the pedestal/plug assembly 14/18 to the above-ground position. The pedestal housing and plug assembly are carried on the swing-arm, and the swing-arm is shown being raised toward the above-ground position, rotating the pedestal/plug assembly about the axis of the hinged structure contained in the swing-arm assembly 26.

Figure 4:
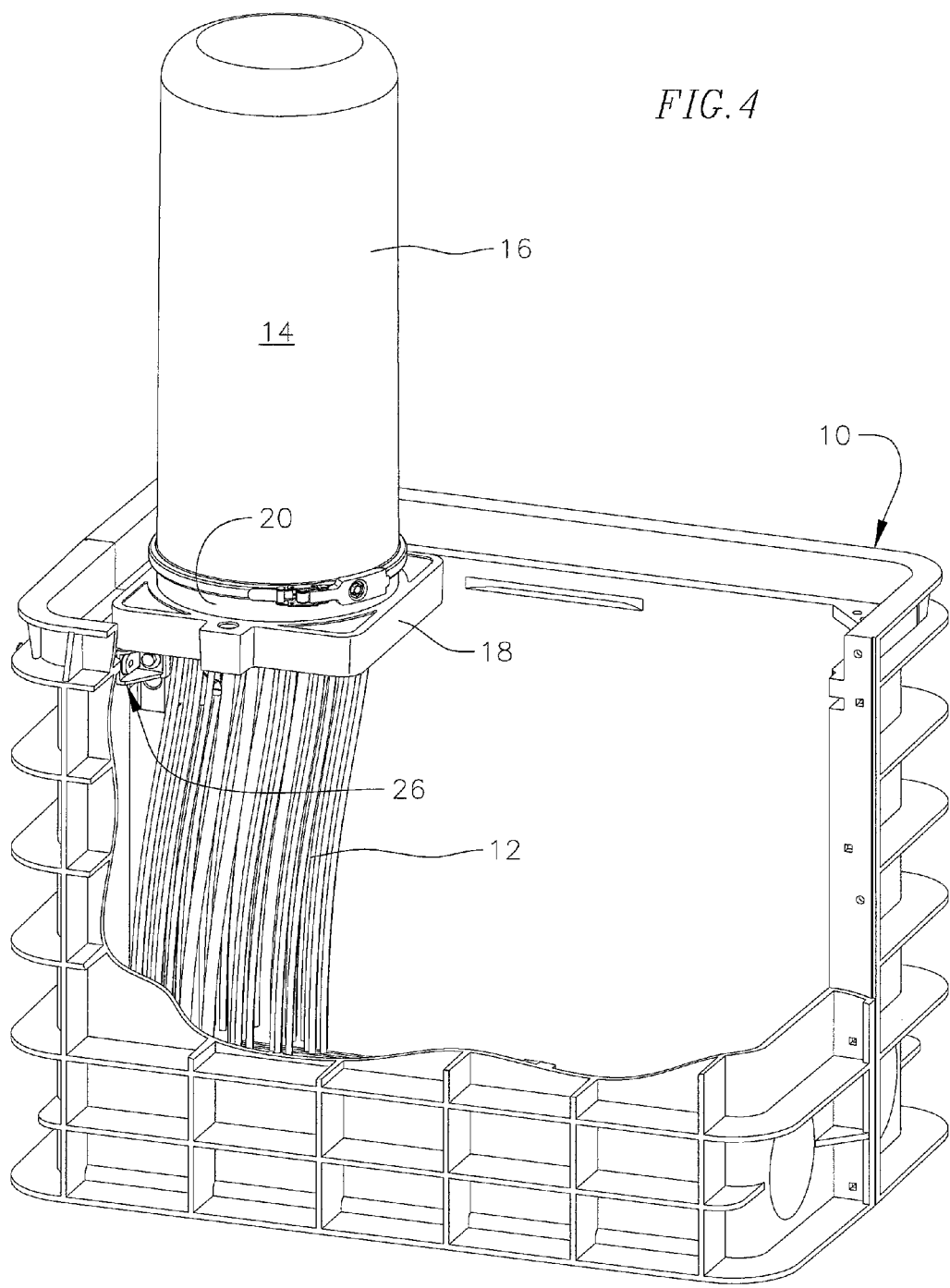
FIG. 4 is a perspective view, partly broken away, showing the pedestal on the swing-arm having been rotated to a raised position.

FIG. 4 shows the pedestal housing and the plug on the swing-arm having been rotated to a raised position. The wiring 12 is carried by the pedestal's interior structure as the pedestal/plug assembly 14/18 rotates to the above-ground position.

Figure 5:
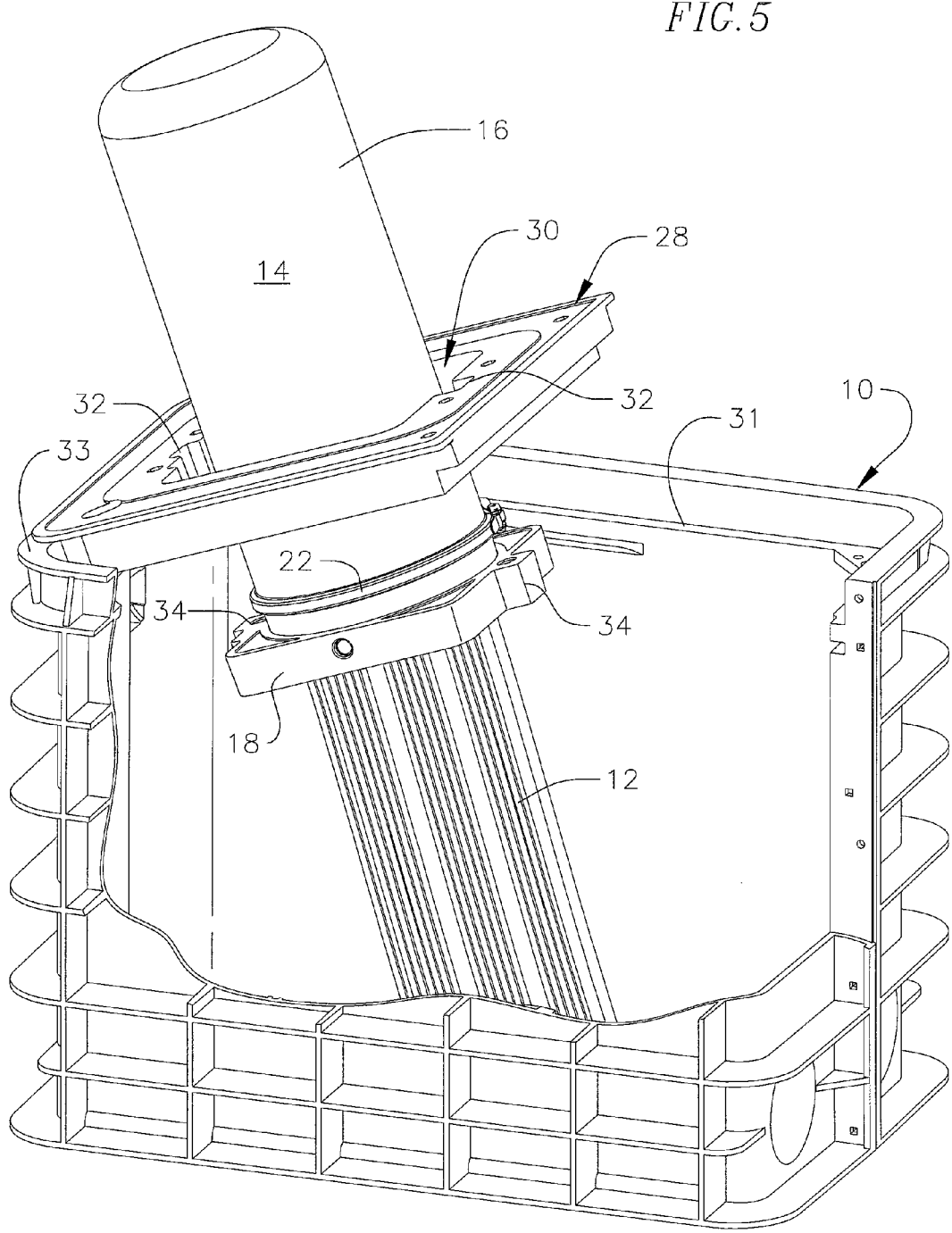
FIG. 5 is a perspective view, partly broken away, showing the pedestal removed from the swing-arm and being fed up though an access opening in a split cover plate lid.

FIG. 5 shows the pedestal housing and plug assembly 14/18 having been removed from its swing-arm assembly. The pedestal housing and plug assembly are adapted for positioning in a split cover plate lid 28 shown in FIG. 5. The split cover plate lid has a structure similar to the pedestal mounting section of the split cover plate described in the '137 and '888 patents referred to previously. The split cover plate lid 28 has an access opening 30 located in a pedestal mounting section of the split cover plate. The access opening also includes notched areas 32 at opposite ends configured to match the shapes of corresponding fastening sections 34 projecting from opposite ends of the plug 18. The fastening sections 34 can comprise bendable clips as shown in the '888 and '137 patents, for example. The split cover plate lid 28 is placed over the top of the pedestal housing, as shown on FIG. 5, so the pedestal 14 may project up through the access opening 30 above the plug 18 which remains below the plug opening. An edge of the split cover plate lid 28 is positioned to rest on a cooperating rim 31 in the access opening to the top of the grade level box. Alternatively, the flanged edge of the split cover plate lid 28 can rest on a top edge 33 of the grade level box when the cover plate lid is rotated to the position shown in FIG. 5. The wiring 12 is shown being drawn up as a unit with the pedestal housing as the pedestal and plug assembly 14/18 is fed up through the access opening in the split cover plate lid.

Figure 6:
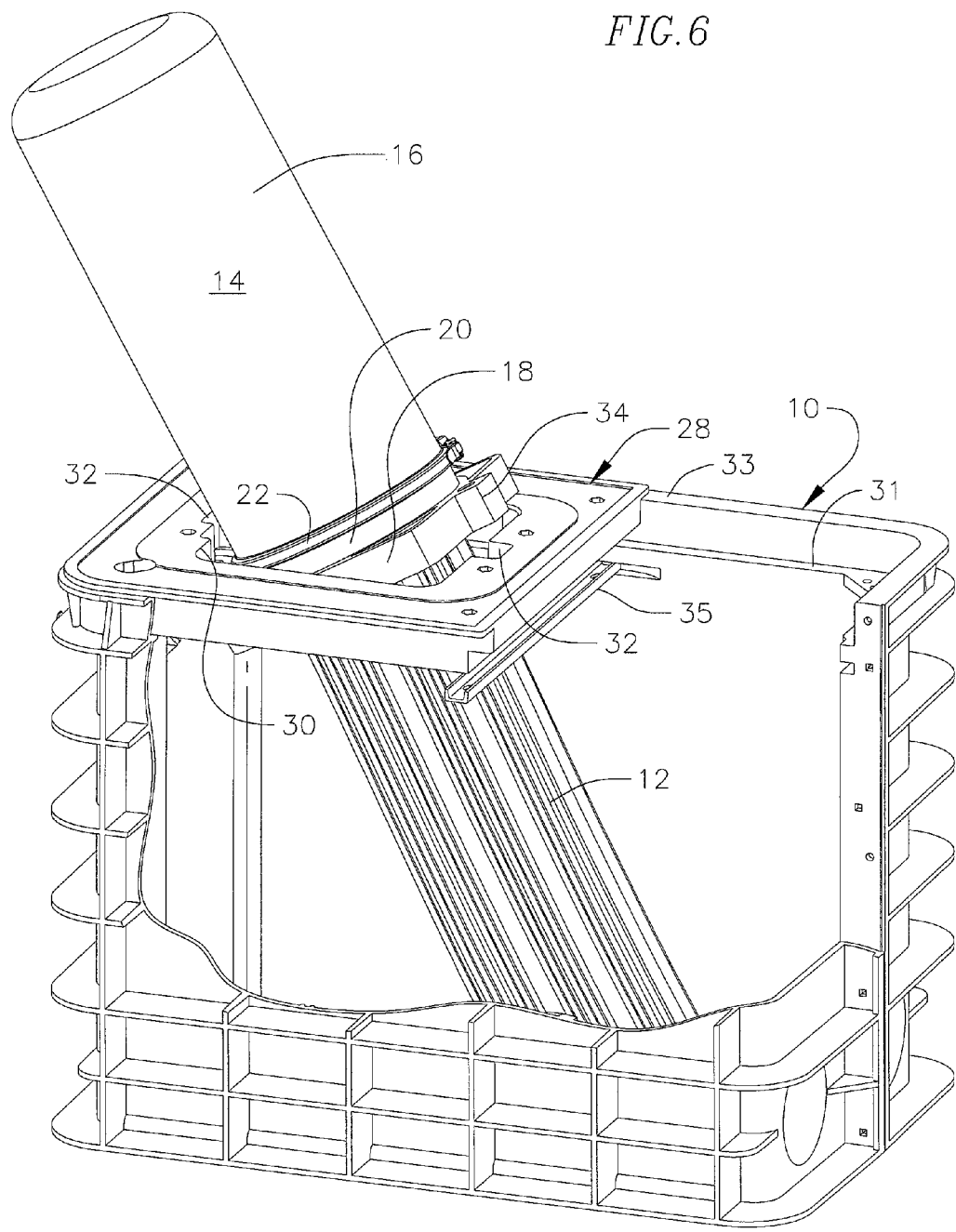
FIG. 6 is a perspective view, partly broken away, showing the pedestal assembly being tilted to pass the base of the assembly through the access opening in the split cover plate lid.

FIG. 6 shows the process of passing the plug 18 up through the access opening 30 in the split cover plate lid 28. The pedestal housing 14 is tilted to pass the plug 18 at its base up through the access opening.

Figure 7:
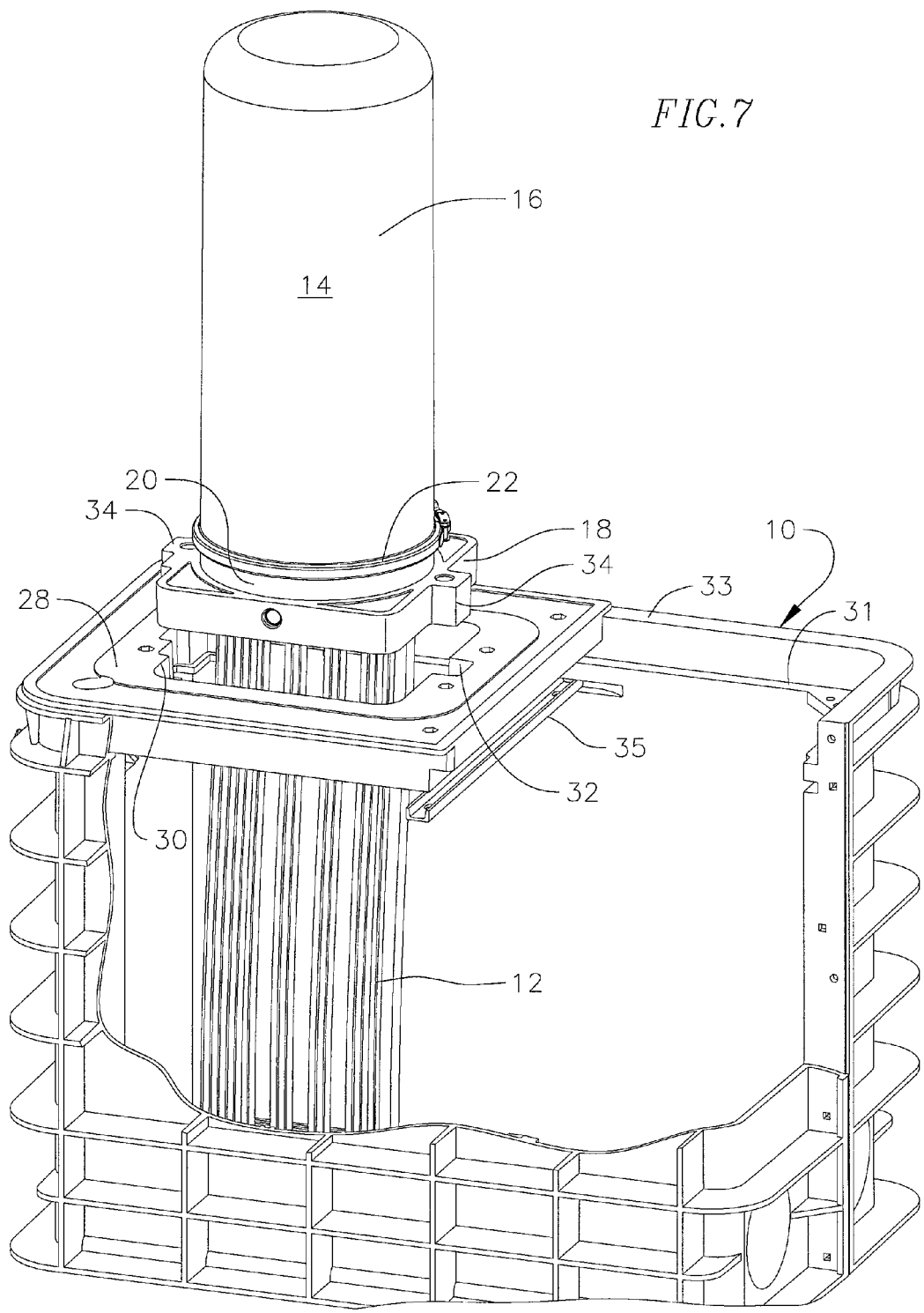
FIG. 7 is a perspective view, partly broken away, showing the pedestal housing assembly raised above the access opening in the split cover plate and in which a second part of the split cover plate is shown in a side-by-side position to close off the top of the grade level box.

FIG. 7 shows the pedestal housing and plug assembly having been raised up through the access opening in the split cover plate lid, ready to be positioned in the access opening 30. This view also shows a rigid channel-shaped support bar 35 positioned in slotted openings in opposite sides of the grade level box. The support bar provides rigid support for the center of the split cover plate, including the free end of the cover plate lid 28.

Figure 8:
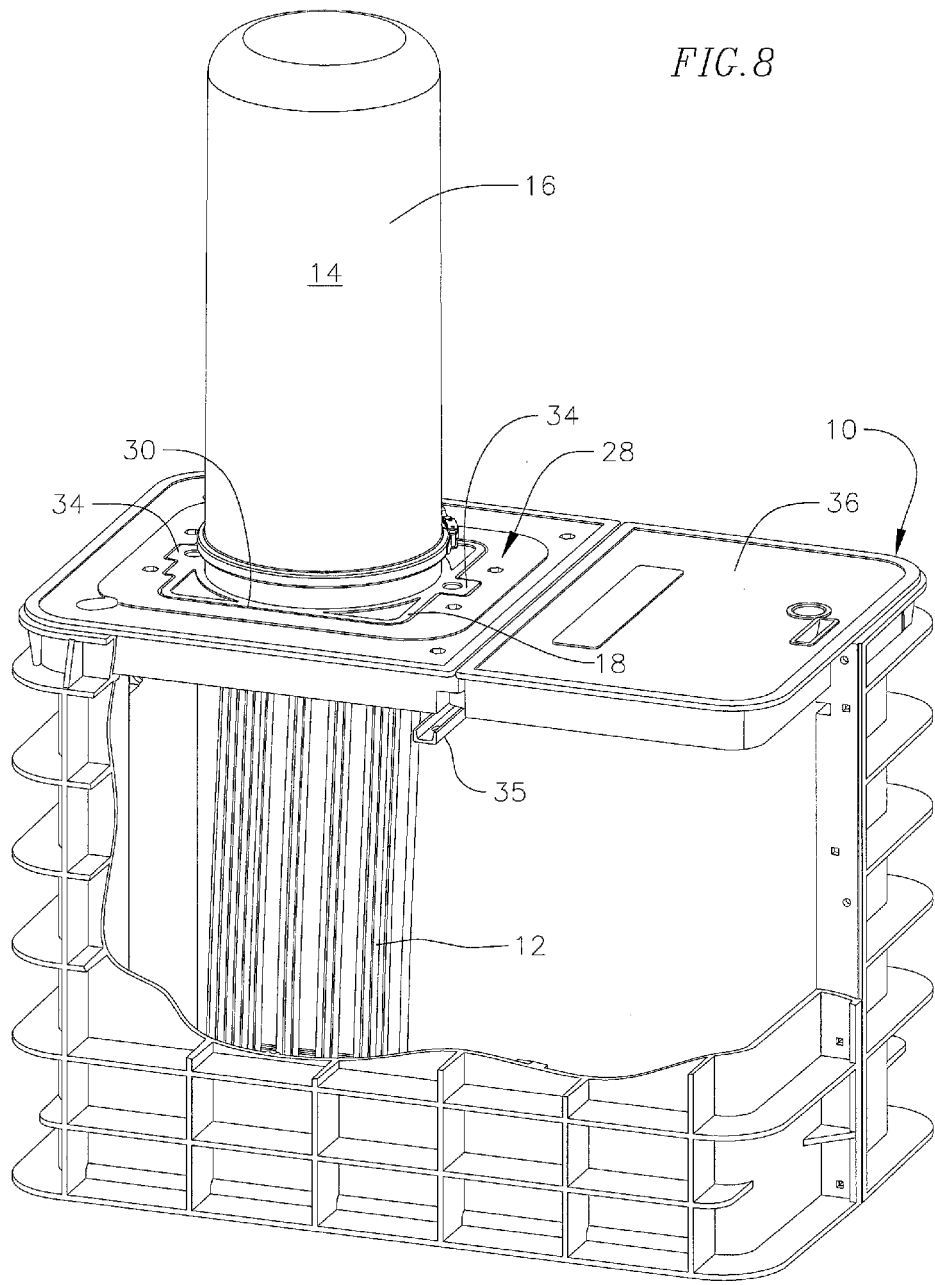
FIG. 8 is a perspective view, partly broken away, showing the pedestal assembly in an above-ground installation on the split cover plate.

FIG. 8 shows the pedestal housing and plug assembly 14/18 in its above-ground installation on the split cover plate. The fastening sections 34 at the opposite ends of the plug 18 are shown having been removably fastened to the opening 30 in the split cover plate lid 28. As shown in FIG. 8, the wiring 12 remains attached to connections within the pedestal housing to provide electrical connections from below-ground to the above-ground pedestal assembly. The pedestal housing can be used for making above-ground optical fiber splice connections, for example. FIG. 8 also shows a solid split cover plate lid 36 for providing a two-part lid assembly from the side-by-side cover plates (28, 36) that are mounted on the rim 31 to close off the top of the grade level box. Alternatively, the lid for the illustrated installation can comprise a one-piece cover plate with the profiled plug opening as shown.

The pedestal assembly can be moved back into the storage position shown in FIG. 1 by reversing the steps shown in FIGS. 1-8.

Thus, the invention provides for conversion of a flush-to-grade installation to an above-ground pedestal installation, but the installation can be reversed to go in the other direction. In one embodiment, one or more optical fiber splice connections can be present in the pedestal when stored below-ground. The pedestal can be moved above-ground for access at different times when making further splice connections.

Figure 9:
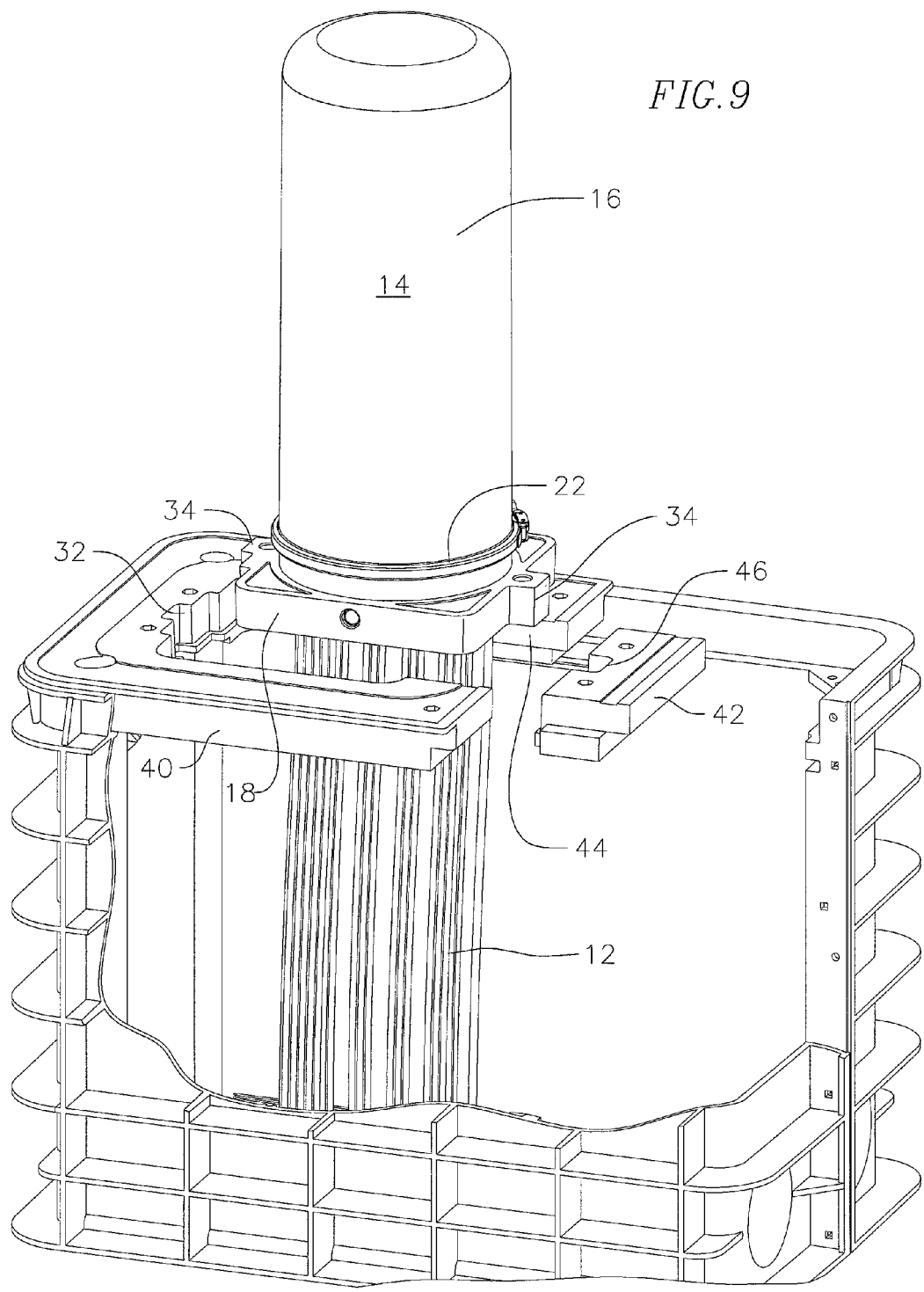
FIG. 9 is a perspective view, partly broken away, showing an alternative embodiment having a segmented split lid.

FIG. 9 shows an alternative embodiment of the split cover plate lid: in this embodiment a segmented split cover plate lid 40. The free end of the split cover plate lid includes a segmented portion in the form of a short narrow block 42 that makes a sliding fit in the end of the split lid. The block is removably attached to the free end of the split lid by a tongue and grove fit with fasteners or other means for removably securing the block to the end of the lid. This alternative configuration is shown with the block 42 removed from an open section 44 at the end of the split lid 40. With the block removed, the pedestal housing and plug assembly 14/18 can be drawn up through the access opening 45 in the split lid without the need for tilting it as shown in FIG. 6. Once the plug section is raised above the split lid, the block 42 can be repositioned in the end of the split lid, with a notched region 46 in the block engaged with the projecting area 34 at the end of the plug. The pedestal housing and related assembly is then positioned in the above-ground pedestal installation similar to that shown in FIG. 8. The support bar 35 also can be positioned in the vault to support the free ends of the cover plate lid components, as shown in FIGS. 6-8.

FIGS. 10-14 show a more detailed construction of the swing-arm bracket assembly 26 and its attachment to the plug 18. The bracket assembly includes a rigid two-part mounting bracket 48 rigidly affixed to an inside wall of the grade level box. The brackets are secured to the wall by fasteners 49. The brackets 48 hold opposite sides of an elongated swing-arm 50 having its free end 52 bolted to the plug 18 via fasteners 53. The free end of the swing-arm fits inside a channel-shaped bracket 54 affixed to the inside of the plug.

The swing-arm 50 is carried on a two-part assembly which includes a base 56 shaped as rectangular block, and a U-shaped stop 58 rigidly affixed to the bottom of the base. The inside length of the swing-arm is rigidly affixed to the top of the base by fasteners 60. The rear edges 62 of the stop 58 engage the inside face of the enclosure to hold the swing-arm (and the pedestal housing) in a horizontal position for storing the pedestal housing in the grade level box as shown in FIG. 1.

The inside end of the swing-arm rotates about the horizontal axis through a hinged connection between the brackets 48, for raising the pedestal housing assembly and plug away from its storage position as shown in FIG. 3. The fasteners 53 can be accessed for removing the pedestal/plug assembly from the swing-arm as shown in FIG. 5.

The hinge assembly (shown best in FIG. 13) includes a roller shaft 64 carried on opposite inside faces of the brackets 48. The roller shaft extends through an elongated opening 66 in the base 56. An elongated pin 68 extends through the roller, and fasteners 70 secure the brackets to opposite sides of the base 56. The swing arm, together with the base 56 and stop 58, rotate relative to the rigidly mounted brackets 48, free to rotate about the shaft 64.

Figure 14:
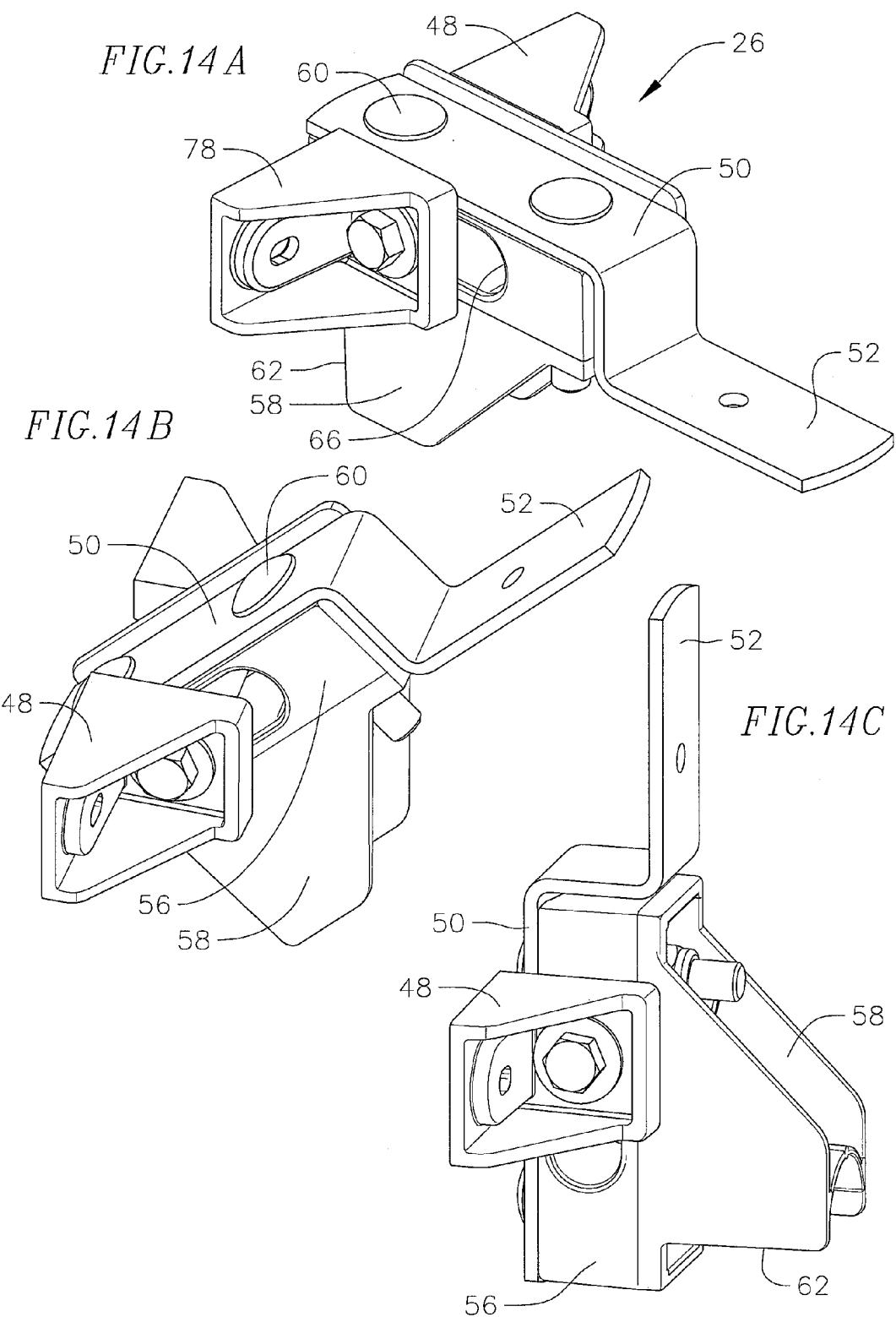
FIGS. 14A, 14B, and 14C are perspective views showing a range of motion of the swing-arm assembly.

FIG. 14 illustrates the range of motion of the swing-arm when rotating about a horizontal axis through the roller 64. FIG. 14A shows the swing-arm in its fixed horizontal position for holding the pedestal housing in the stored position. In the FIG. 14A orientation the rear edge 62 of the stop 58 engages the inside wall of the enclosure. FIG. 14B shows the swing-arm having rotated through an angle toward the upright position shown in FIG. 14C.

FIG. 15 shows an assembly of the plug 18 and collar 20 which forms a base of the pedestal housing. The plug contains a large central opening 70 with a bottom rim 72. The collar has a narrow lower section 74 aligned with and recessed in the opening 70. In the alignment process the holes 76 and 78 on the collar base 74 and plug 18 are aligned for later attachment to the swing-arm 52 via the fasteners 53. Preferably the collar is rigidly affixed to the opening 70 by adhesive bonding techniques. The height of the lower collar section 74 is adjusted during the molding process so that the plug and pedestal assembly will fit into the stored position of FIG. 1.

FIGS. 15 and 16 show more detailed construction of an upper section 80 of the collar. The lower collar section 74 and upper collar section 80 are separated by a circular rim 82 that engages the plug 18 when the collar is seated in the plug opening 70. The upper section 80 of the collar has a molded top plate 82 facing toward the interior of the pedestal housing during use. The top plate 82 includes tubular sleeves and fittings, generally at 84, for containing various lengths and cross-sections of conduits, wires, fiber optic cables and the like running from below ground through sealed openings in the collar and into the interior of the pedestal housing.

FIG. 17 shows an exploded assembly view with the various components of the swing-arm assembly and pedestal housing. This view includes an O-ring 86 which seats on the rim 82 for sealing the base of the enclosure cover 14 around the upper portion 80 of the collar when the clamp 22 is used to secure the bottom of the cover 14 to the assembled plug and collar.

What is claimed is:

1. A grade level enclosure conversion assembly adapted for converting a pedestal assembly between a flush-to-grade and an above-ground installation, the pedestal assembly comprising a pedestal housing and a base secured to the pedestal housing and removably mounted to a rotatable swing-arm contained in a grade level box, the swing-arm holding the pedestal assembly in a stationary stored position in the flush-to-grade installation, the pedestal assembly adapted for conversion to the above-ground pedestal installation by rotation of the swing arm to a raised position from which the pedestal assembly can be removed from the swing-arm and fed through an access opening in a separate cover plate lid, the base of the pedestal housing including a plug adapted for removable positioning in the access opening in the cover plate lid to hold the pedestal assembly in the above-ground position when the cover plate lid is positioned atop the grade level box.

2. Apparatus according to claim 1 in which the cover plate lid comprises one part of a split cover plate, or a solid one-piece lid that encloses the top of the grade level box.

3. Apparatus according to claim 1 in which the cover plate lid has a removable segmented portion at a free end thereof.

4. An underground utilities enclosure adapted for converting electrical connections between above-ground and below-ground installations, comprising:
   a grade level enclosure;
   a pedestal assembly in the grade level enclosure, the pedestal assembly comprising:
      (a) a pedestal housing,
      (b) a plug rigidly affixed to a base portion of the pedestal housing, and
      (c) underground conduits passing from below-ground into the pedestal housing; and
   a swing-arm assembly rigidly affixed at one end thereof to an inside of the grade level enclosure, the swing-arm assembly holding the pedestal assembly in a stationary stored position in the enclosure, the pedestal assembly rotatable on a hinged swing-arm portion of the swing-arm assembly to an upright above-ground position to provide access to the interior of the housing for making said electrical connections, the pedestal assembly removable from the swing arm and adapted for removable positioning of the plug thereon in an access opening of a cover plate lid, to hold the pedestal assembly in the above-ground position on the cover plate lid which is adapted to close off at least a portion of the enclosure.

5. Apparatus according to claim 4 in which the conduits comprise fiber optic conduits adapted for splice connections inside the pedestal housing.

6. Apparatus according to claim 4 in which the cover plate lid comprises one part of a split cover plate, or a solid one-piece lid that encloses the top of the grade level box.

7. Apparatus according to claim 4 in which the cover plate lid has a removable segmented portion at a free end thereof.

8. Apparatus according to claim 4 in which the plug is rigidly affixed to a collar that contains seals for the conduits passing through the collar into the interior of the pedestal housing.

9. Apparatus according to claim 4 in which the swing-arm is removably attached to the plug portion of the pedestal assembly.

10. Apparatus according to claim 9 in which the plug is affixed to a collar that contains seals for the conduits, and the base of the pedestal housing is secured to the collar.

* * * * *